United States Patent [19]

Meyers et al.

[11] 3,721,684

[45] March 20, 1973

[54] RABELOMYCIN

[75] Inventors: Edward Meyers, East Brunswick; Dorothy Smith Slusarchyk, Belle Mead; Wenchih Lui, Princeton Junction; William Lawrence Parker, North Brunswick, all of N.J.

[73] Assignee: E. R. Squibb & Sons, Inc., New York, N.Y.

[22] Filed: June 18, 1970

[21] Appl. No.: 47,479

[52] U.S. Cl. ....................260/365, 195/80 R, 424/121

[51] Int. Cl. ..............................................C07c 49/74

[58] Field of Search .......................................260/365

[56] References Cited

UNITED STATES PATENTS 3,686,163 8/1972 Arcamone et al. ....................260/365

*Primary Examiner*—Henry R. Jiles
*Assistant Examiner*—E. Jane Skelly
*Attorney*—Lawrence S. Levinson, Merle J. Smith, Theodore J. Criares and Donald J. Perrella

[57] ABSTRACT

The antibiotic rabelomycin is obtained by the cultivation, under controlled conditions, of *Streptomyces olivaceus* ATCC 21549. Rabelomycin is active against bacteria.

4 Claims, 1 Drawing Figure

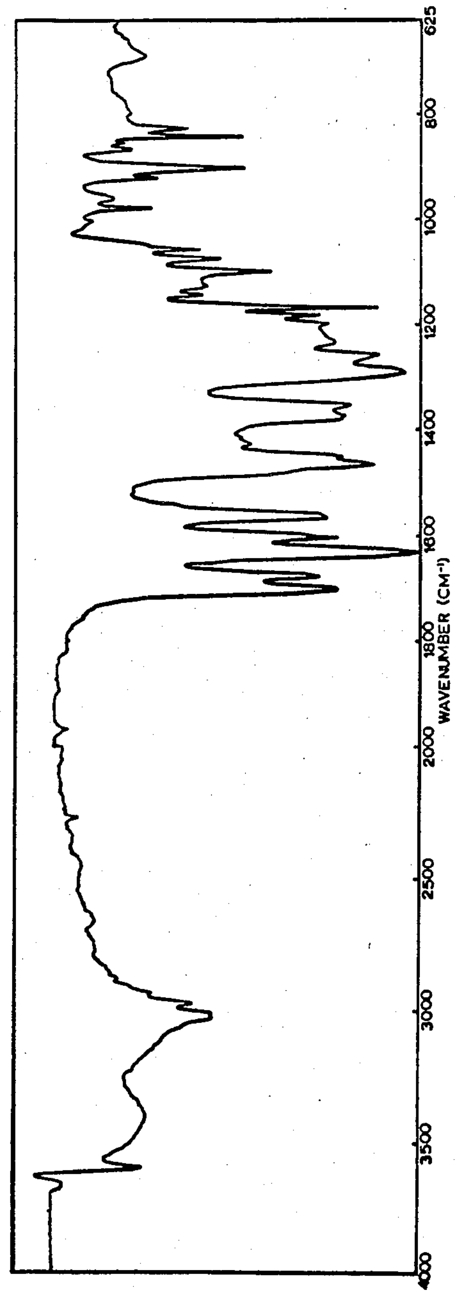
FIG. I
INFRARED ABSORPTION SPECTRUM

RABELOMYCIN

This invention relates to a new and useful antibiotic, rabelomycin, and to a method for its preparation.

THE MICROORGANISM

The microorganism useful for the preparation of rabelomycin is a species of *Streptomyces* hereinafter designated *Streptomyces olivaceus* ATCC 21549. The organism was isolated from a soil sample taken at Jean-Rabel, Haiti. A culture of the living organism has been deposited and made a part of the stock culture collection of the American Type Culture Collection (Rockville, Md.), from whence it is available; and it has been assigned the ATCC number 21549.

It is to be understood that the invention is not limited to the use of the particular organism described herein, but includes inter alia, mutants produced from the described organism by mutating agents, such as, for example, X-rays, ultraviolet radiation and nitrogen mustards.

For isolating and characterizing the organism, a portion of the soil sample is shaken in sterile distilled water and plated on a nutrient agar containing:

| | Grams |
|---|---|
| Agar | 15 |
| Glycerol | 10 |
| Citric Acid | 1.2 |
| $(NH_4)_2HPO_4$ | 0.4 |
| KCl | 0.08 |
| $MgCl_2 \cdot 6H_2O$ | 0.418 |
| $MnCl_2 \cdot 4H_2O$ | 0.036 |
| $FeCl_3 \cdot 6H_2O$ | 0.023 |
| $ZnCl_2 \cdot 6H_2O$ | 0.021 |
| $CoCl_2 \cdot 6H_2O$ | 0.004 |
| Distilled water to 1000 ml | |

The medium is adjusted to pH 7.0 and sterilized in an autoclave at 121° C for 30 minutes. After 7 to 10 days incubation at 25° C, colonies of *Streptomyces olivaceus* ATCC 21549 are isolated from the plated soil. These isolated colonies are then grown on a medium containing:

| | Grams |
|---|---|
| Beef Extract | 1.0 |
| Yeast Extract | 1.0 |
| NZ Amine A | 2.0 |
| Glucose | 10.0 |
| Agar | 15.0 |
| Distilled water to 1000 ml | |

The medium is adjusted to pH 7.3 and autoclaved at 121° C for 30 minutes.

The organism is a member of the gray spore color series of Pridham. It produces a spore mass that is medium gray (ISCC No. 265) in color, matching color chip (2 Fe) in the Color Harmony Manual. Sporulation is abundant on standard International Streptomyces Project media:ISP-2, yeast extract-malt extract agar; ISP-3, oatmeal agar; ISP-4, inorganic salts-starch agar. The reverse color on these three media is in shades of khaki. No melanoid pigment is produced on proteinaceous media.

Microscopically, the sporophores are in extended spirals and the spore surface is smooth.

A summary of the similarities and differences between *Streptomyces olivaceus* ATCC 21549 and the type strain of *Streptomyces olivaceus* is set out below:

| | *S. olivaceus* ATCC No. 21549 | *S. olivaceus* IMRU 3335 |
|---|---|---|
| Spore color series | Gray | Gray |
| Sporophore morphology | Open spiral | Open spiral |
| Spore surface | Smooth | Smooth |
| Melanoid pigment | None | None |
| Reverse color | Khaki | Dark Brown |
| Carbon Utilization | | |
| glucose | + | + |
| d-mannitol | + | + |
| i-inositol | ± | + |
| d-xylose | + | + |
| l-arabinose | + | + |
| l-rhamnose | − | + |
| d-fructose | − | + |
| raffinose | − | − |
| sucrose | − | − |

The differences in utilization of rhamnose and fructose are considered minor, and do not provide a basis for species separation.

THE ANTIBIOTIC

*Streptomyces olivaceus* ATCC 21549 produces an antibiotic (rabelomycin) that possesses activity primarily against gram positive bacteria. To form the antibiotic, *Streptomyces olivaceus* ATCC 21549 is grown at about room temperature, e.g., at 25° C, under submerged aerobic conditions in an aqueous nutrient medium containing an assimilable carbohydrate and an assimilable organic nitrogen source. The fermentation is carried out for several days, e.g., for approximately 96 hours, at the end of which time the antibiotic has been formed.

After the fermentation is completed, the broth is adjusted with concentrated HCl to a pH of about 6 and filtered. The antibiotic is extracted from the mycelium (i.e., filter cake) with methanol. The methanol solution is concentrated in vacuo, leaving an aqueous suspension. The aqueous suspension is pooled with the broth filtrate, and the aqueous pool is extracted with water-saturated ethyl acetate. The organic phase is dried with anhydrous sodium sulfate and concentrated to a syrup. Further purification is effected by countercurrent distribution of the syrup with the system of methanol:water: hexane (3:1:4, v/v/v). The bioactive fractions are pooled and reextracted into ethyl acetate. The residue obtained by concentrating the ethyl acetate extracts to dryness is further purified by column chromatography on DEAE cellulose, followed by preparative scale chromatography on silica gel plates. Final purification is obtained by crystallization and recrystallization from benzene-methanol.

PROPERTIES OF RABELOMYCIN

Rabelomycin has the structure

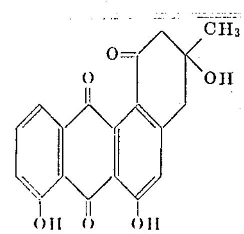

Rabelomycin can be dehydrated by reaction with a mineral acid, such as concentrated hydrochloric acid or concentrated sulfuric acid, to form dehydrorabelomycin having the structure

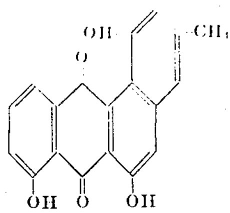

Rabelomycin forms esters of acids, for example, by treating the rabelomycin with an acyl halide, such as acetyl chloride, or an acid anhydride, such as acetic anhydride, in the presence of a base, such as pyridine. Rabelomycin also forms esters of amino acids, such as glycine or phenylalanine.

Rabelomycin contains three acylable hydroxyl groups and is capable of forming mono-, di- and tri-esters depending on the ratio of acylating agent to rabelomycin present in the reaction medium. A mixture of monoesters, in which one of the two phenolic hydroxyl groups is acylated by using one equivalent of rabelomycin, can be separated by chromatography. Using two equivalents of acylating agent per equivalent of rabelomycin causes acylation of both phenolic hydroxyl groups. By treating rabelomycin with three equivalents of acylating agent, the tertiary hydroxyl group can also be esterified. However, the predominant reaction is dehydration followed by acylation to give triesters of dehydrorabelomycin. These triesters can also be obtained from dehydrorabelomycin by treatment with acylating agents.

Although any acylating agent can be used, the preferred acylating agents are the acid anhydrides and acyl chlorides of hydrocarbon carboxylic acids of less than twelve carbon atoms, such as the lower alkanoic acids (e.g., acetic and propionic acids), the lower alkenoic acids, the monocyclic aryl carboxylic acids (e.g., benzoic acid), the monocyclic aryl lower alkanoic acids (e.g., phenacetic acid), the cycloalkane carboxylic acids and the cycloalkene carboxylic acids.

Rabelomycin forms salts with bases, for example, by reacting the rabelomycin with an alkali metal hydroxide or alkaline earth metal hydroxide, such as sodium hydroxide, potassium hydroxide, calcium hydroxide, barium hydroxide or magnesium hydroxide.

Crystalline rabelomycin has the following physical and chemical properties:

Color: Yellow

Melting Point: 193° C. (decomp.)

Elemental Analysis:

Percent $C=67.17$ $H=4.48$ $O=28.35$ (by difference)

This analysis and the high resolution mass spectrum establish the empirical formula as $C_{19}H_{14}O_6$.

Solubility:

Soluble in alcohol, acetone, chloroform.

Insoluble in water and petroleum ether.

Ultraviolet Absorption Spectrum: The ultraviolet absorption maxima of crystalline rabelomycin in neutral methanol or in 0.02 N HCl in methanol are:

| λ max (nm): | ε |
|---|---|
| 228 | 26,600 |
| 267 | 28,800 |
| 433 | 8,000 |

The ultraviolet absorption maxima in 0.02 N NaOH in methanol are:

| λ max (nm): | ε |
|---|---|
| 258 | 26,200 |
| 282 (shoulder) | 13,100 |
| 325 | 8,900 |
| 507 | 7,500 |

Infrared Spectrum: The infrared absorption spectrum of rabelomycin as a 4 percent solution in chloroform is reproduced in FIG. 1. Significant absorption bands, listed in reciprocal centimeters, are:

| | | |
|---|---|---|
| 3400 $cm^{-1}$ | 1290 | 921 |
| 2974 | 1259 | 903 |
| 1700 | 1181 | 867 |
| 1675 | 1168 | 855 |
| 1630 | 1141 | 843 |
| 1602 | 1127 | 828 |
| 1566 | 1099 | |
| 1463 | 1074 | |
| 1448 | 1057 | |
| 1375 | 979 | |
| 1352 | 960 | |

Optical Rotation: $[\alpha]_D=-102\pm10°$ (c=1, $CHCl_3$).

NMR Spectrum: The nmr spectrum was determined in chloroform-d, using a Varian T-60 nmr spectrometer. Chemical shifts in parts per million downfield from a tetramethylsilane internal standard, multiplicites and relative intensities are indicated below:

| Chemical Shift[a] | Multiplicity[b] | Relative Area |
|---|---|---|
| 1.47 | *s* | 3 |
| 2.37 | broad | 1 |
| 2.98 | *s* | 2 |
| 3.06 | *s* | 2 |
| 6.92 | *s* | 1 |
| 7 to 8 | *m* | 3 |
| 11.60 | *s* | 1 |
| 12.21 | *s* | 1 |

[a] In parts per million downfield from tetramethylsilane used as an internal standard.

[b] *s*=singlet, *m*=multiplet Rabelomycin, its salts, the dehydration product and esters thereof are effective in inhibiting the growth of bacteria.

In a two-fold tube dilution assay done with crystalline rabelomycin, the minimum inhibiting concentration (M.I.C.) in micrograms per ml was determined to be as follows:

| Microorganism | M.I.C. (μg/ml) |
|---|---|
| *Staphylococcus aureus* 209P | 6.3 |
| *Streptococcus pyogenes* C203 | 1.2 |
| *Bacillus subtilis* | 4.7 |
| *Escherichia coli* | >50 |
| *Salmonella schottmuelleri* | >50 |
| *Pseudomonas aeruginosa* | >25 |
| *Candida albicans* | >50 |
| *Trichophyton mentagrophytes* | >25 |

Rabelomycin can be used in research and hospital laboratories to isolate gram negative bacteria from soils or from swabs or from body exudates in which mixed populations of gram positive and gram negative organisms are present. Rabelomycin can also be used to disinfect laboratory equipment contaminated with *Staphylococcus aureus* especially when the equipment may be subject to damage by the usual means of disinfection.

The following examples further illustrate the invention:

EXAMPLE 1

Tomato paste-oatmeal agar slants are seeded with *Streptomyces olivaceus* ATCC 21549. They are incubated 14 days and then used to inoculate 50 ml of aqueous soybean meal medium contained in 250 ml Erlenmeyer flasks. The composition of the germination medium is as follows:

| | Grams |
|---|---|
| Soybean meal (Staley's 4S) | 15.0 |
| Dehydrated mashed potato | 15.0 |
| Glucose | 50.0 |
| $CoCl_2 \cdot 2H_2O$ | 0.005 |
| $CaCO_3$ | 10.0 |
| Agar | 2.5 |
| Distilled water to 1,000 ml. | |

The medium, prior to inoculation, is sterilized for 30 minutes at 121° C and at 15 lbs. steam pressure. The inoculated germination flasks are incubated at 25° C for 72–96 hours on a rotary shaker, operating at 280 r.p.m. with a 2-inch throw.

Fermentation Conditions

A 5% (v/v) transfer is made from the germination flask to 500 ml Erlenmeyer flasks containing 100 ml of the following medium:

| | Grams |
|---|---|
| Soybean meal (Staley's 4S) | 30.0 |
| Dehydrated mashed potato | 15.0 |
| Glucose | 15.0 |
| $CoCl_2 \cdot 2H_2O$ | 0.005 |
| $CaCO_3$ | 10.0 |
| Distilled water to 1,000 ml. | |

The fermentation flasks are incubated and agitated as are the germination flasks. Samples are taken at 72 and 96 hours and centrifuged. The supernate is decanted and the mycelium is extracted with a volume of methanol equal to that of the decanted supernate. The supernate is extracted with 0.5 volume of ethyl acetate saturated with water. Both ethyl acetate and methanolic extracts are examined by chromatography on silica gel with a solvent system of the following composition: chloroform:methanol: piperidine (94:5:1, v/v/v). In this system, the antibiotic has an Rf value of approximately 0.45. The antibiotic is detected by bioautography against *Staphylococcus aureus* 209P. The methanol and ethyl acetate extracts of the 72 and 96 hour fermentations have activity due to rabelomycin, demonstrated by chromatography and bioautography.

EXAMPLE 2

A 250 liter batch of *Streptomyces olivaceus* ATCC 21549 is fermented in a 100 gal. stainless steel vessel with the medium and operating conditions described below:

Stage 1

Inoculum: The culture of *Streptomyces olivaceus* ATCC 21549 is preserved by lyophilization in milk and grown out on a tomato paste-oatmeal agar slant. Surface growth from a slant is suspended into 11 ml of 0.01 percent Dupanol solution, and 3 ml of this suspension is used as the source of inoculum.

| Medium: | Grams |
|---|---|
| Soybean meal (Staley's 4S) | 15.0 |
| Dehydrated mashed potato | 15.0 |
| Glucose | 50.0 |
| $CoCl_2 \cdot 2H_2O$ | 0.005 |
| $CaCO_3$ | 10.0 |
| Agar | 2.5 |
| Distilled water to 1,000 ml. | |

100 ml of this medium containing 3 ml of the *S. olivaceus* suspension in a 500 ml Erlenmeyer flask is incubated 96 hours on a rotary shaker at 25° C. The shaker operates at 280 r.p.m. with a 2-inch throw.

Stage 2

Inoculum: 100 ml from first stage.

Medium: Same as stage 1. One thousand ml of medium and inoculum in a 4,000 ml Erlenmeyer flask is incubated 72 hours at 25° C on a reciprocating shaker. The shaker is operated at 120 strokes per minute with a 2-inch throw.

Stage 3

Inoculum: 1,000 ml from stage 2.

Medium: Same as stage 1. Thirty liters of medium and inoculum in a 38 liter fermentation vessel is incubated for 96 hours at 25° C. During incubation, the broth is agitated and aerated at the rate of 2.0 foot per minute superficial air velocity.

Stage 4

Inoculum: 12,500 ml from stage 3.

Medium:

| | Grams |
|---|---|
| Soybean meal (Staley's 4S) | 30.0 |
| Dehydrated mashed potato | 15.0 |
| Glucose | 15.0 |
| $CoCl_2 \cdot 2H_2O$ | 0.005 |
| $CaCO_3$ | 10.0 |
| Distilled water to 1,000 ml. | |

Two hundred fifty liters of the medium containing the inoculum is incubated 96 hours. During incubation, the broth is agitated and aerated at the rate of 2.0 feet per minute superficial air velocity.

EXAMPLE 3

Two hundred forty liters of the fermentation broth, obtained as described in Example 2, are adjusted to pH 6.0 with concentrated hydrochloric acid and filtered to give 72.5 kg of insoluble mycelial cake and 190 liters of filtrate.

EXAMPLE 4

The filter cake (72.5 kg), obtained in Example 3, is extracted three times with 100 liter portions of methanol. The cake is filtered off between extractions. The combined methanol extracts are concentrated in vacuo to 13.5 liters to remove the methanol, and the resulting aqueous suspension is added to the 190 liters of filtrate obtained in Example 3.

EXAMPLE 5

The combined aqueous layers are extracted three times with 70 liter portions of ethyl acetate saturated with water. The pooled ethyl acetate extracts are concentrated in vacuo to yield approximately 400 grams of a brown syrup. One hundred grams of the syrup is distributed between the two layers of the solvent system: methanol:water:hexane (3:1:4, v/v/v). The distribution is carried out in six, 500 ml separatory funnels, using 200 ml each of the top and bottom solvent layers per funnel. Twelve transfers are done. The bioactive fractions, located by paper disc-agar diffusion assay against *Staphylococcus aureus* 209P, are pooled, concentrated to remove solvent, and re-extracted into ethyl acetate saturated with water. The ethyl acetate extract is dried with anhydrous $Na_2SO_4$ and concentrated to dryness. Thirty grams of dry residue is obtained.

EXAMPLE 6

Ten grams of residue, obtained in Example 5, is dissolved in 20 ml of methanol. The solution is placed on top of a DEAE-cellulose column, 3.8 cm × 45 cm, containing approximately 40 grams of the DEAE-cellulose (Cellex-D, Bio-Rad Laboratories, Richmond, California) packed in methanol. The column is developed with methanol, and 20 ml fractions are collected. The bioactive fractions, as determined by paper disc-agar diffusion assay against *Staphylococcus aureus* 209P, are combined and concentrated to dryness, yielding 1 g of residue.

EXAMPLE 7

One gram of the residue, obtained in Example 6, dissolved in MeOH is streaked 2 cm from the bottom of 20 cm × 20 cm 1,000 $\mu$ layer silica gel plates (Quanta/gram, Quantum Industries, Fairfield, N.J. 07006). The plates are developed with 10 percent methanol in benzene. Rabelomycin, appearing as a yellow band ($R_f$=0.5), is scrapped off the plate, and eluted from the silica gel with acetone. The acetone eluate is concentrated to dryness, and the residue, dissolved in a small volume of MeOH, is rechromatographed on silica gel plates as described above.

Crystallization of the bioactive fraction from the silica gel plates is accomplished in benzene-methanol. Rabelomycin crystallizes as yellow needles, approximately 70 mg being obtained.

EXAMPLE 8

Dehydrorabelomycin is prepared as follows:

Rabelomycin is dissolved in concentrated sulfuric acid. Water is then added and the resulting mixture is extracted with ethyl acetate. Removal of the solvent gives crude dehydrorabelomycin that is further purified by chromatography on silica gel and recrystallization from ethyl acetate.

EXAMPLE 9

The diacetate of rabelomycin is prepared as follows:

A sample of rabelomycin in dry dimethylformamide is treated with two equivalents of acetic anhydride and a catalytic amount of pyridine at room temperature for 24 hours. The crude product is precipitated by the addition of water and purified by chromatography on silica gel.

EXAMPLE 10

The sodium salt of rabelomycin is prepared as follows:

A sample of rabelomycin is dissolved in one equivalent of 0.1 N NaOH. The resulting solution is taken to dryness in vacuo to form the solid sodium salt.

What is claimed is:

1. A compound of formula:

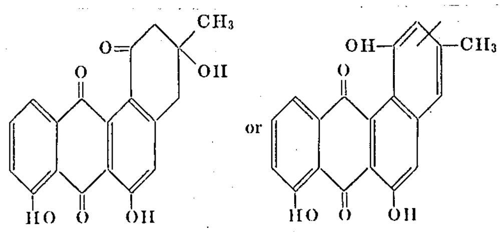

the esters thereof with hydrocarbon carboxylic acids of less than 12 carbon atoms and alkali metal or alkali earth salts thereof.

2. The compound of claim 1 having the formula

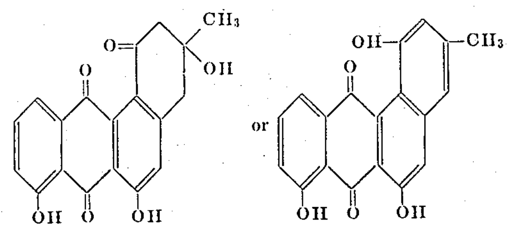

3. The compound of claim 2 having the formula:

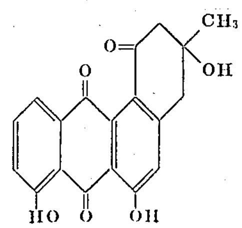

4. The diacetate of the compound of claim 3.

* * * * *